(No Model.)

R. W. WHITNEY.
COMBINED BRAKE AND BELT SHIFTER.

No. 346,696. Patented Aug. 3, 1886.

WITNESSES
N. S. Amstutz
Geo. W. King

Ruel W. Whitney INVENTOR
By
Leggett & Leggett Attorneys

UNITED STATES PATENT OFFICE.

RUEL W. WHITNEY, OF CLEVELAND, OHIO, ASSIGNOR TO THE WHITE SEWING MACHINE COMPANY, OF SAME PLACE.

COMBINED BRAKE AND BELT-SHIFTER.

SPECIFICATION forming part of Letters Patent No. 346,696, dated August 3, 1886.

Application filed March 10, 1886. Serial No. 194,702. (No model.)

*To all whom it may concern:*

Be it known that I, RUEL W. WHITNEY, of Cleveland, in the county of Cuyahoga and State of Ohio, have invented certain new and useful Improvements in Combined Brake Device and Belt-Shifter for Sewing-Machines; and I do hereby declare the following to be a full, clear, and exact description of the invention, such as will enable others skilled in the art to which it pertains to make and use the same.

My invention relates to improvements in a combined brake device and belt-shifter for sewing-machines; and it consists in certain features of construction, and in combination of parts, hereinafter described, and pointed out in the claims.

Figure 1:
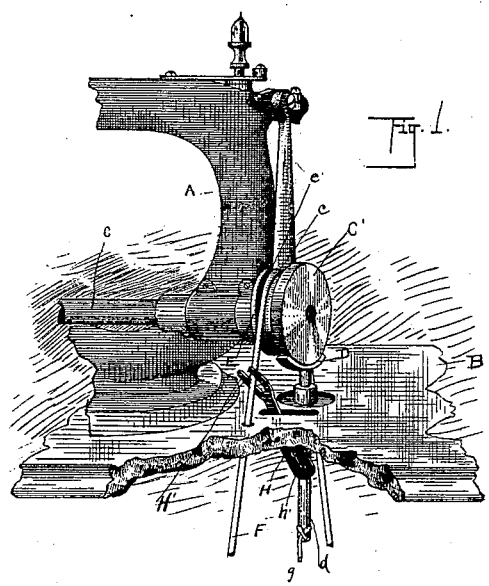
Figure 2:
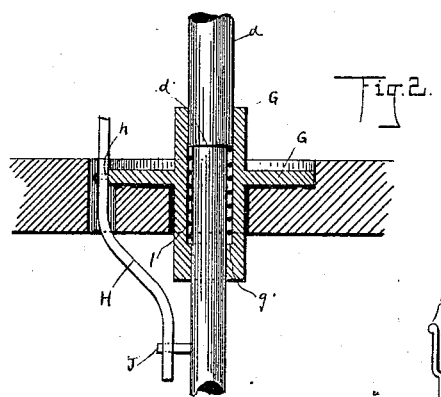
Figure 3:
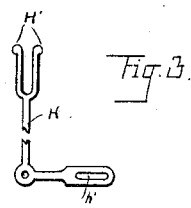

Figure 1 is a view in perspective of a portion of a sewing-machine and table having my improved device attached. Fig. 2 is an enlarged detail in vertical section of the brake-rod, spring, and supporting device. Fig. 3 is a side elevation showing a modification of the belt-shifting lever.

A represents the rear portion of an ordinary sewing-machine mounted in the usual manner on the table B.

C is the driving-shaft, on the rear end of which is secured the disk C'. This disk has a flat periphery that is engaged by the brake D. On the inner face of the disk is a groove, c, for a driving-belt, F, so that the disk serves as a brake-wheel and a driving-pulley. On the inside of the disk, and journaled on the shaft C, is the loose pulley E, the same having a groove, e, for the belt. The ridges between the grooves c and e are small, being only large enough to hold the belt in place while running in either groove, and consequently these ridges offer but little obstruction in shifting the belt from one pulley to the other when the belt is in motion. The brake D is usually of metal and lined with leather or other suitable material. The brake is mounted on the upper end of the rod d, the latter passing with an easy fit through a vertical hole in the sleeve G, the latter having a flange, G', that is secured to the table B. The lower end of the rod d is connected by a wire, g, with a treadle, (not shown,) for depressing or throwing off the brake by the foot of the operator pressing upon the treadle. A spring is connected with the rod d, for elevating the latter in applying the brake. A suitable construction for this part of the mechanism is shown in Fig. 2, in which the shoulder d' of the rod d rests upon the coil-spring i inside the sleeve, and a shoulder, g', near the bottom of the sleeve forms a seat for the spring below. This spring is compressed by the downward movement of the treadle, and when released the coil of the spring elevates the rod and applies the brake.

The apparatus is designed for sewing-machines driven by power, and some belt-shifting device is desirable that will work in combination with the brake, so that both the belt and the brake may be controlled by the same treadle, and so arranged that when the brake is applied the belt will be shifted to the loose pulley, and when the brake is thrown off the belt will be thrown onto the driving-pulley, to accomplish which I have devised the following: H is a belt-shifting lever, pivoted at h to the flange G', and having a forked upper end, the prongs H' of which embrace the belt loosely. The lever is in an inclined position, as shown, so that the lower end thereof extends across the line of the rod d. The lever has a longitudinal slot, h', of some length, in which operates freely a stud or pin, J, the latter being fastened to the rod d. Owing to the inclined position of the lever and slot h' to the line of motion to the rod d, a vertical movement of the latter tilts the lever and moves the prongs H' more or less laterally, such lateral movement being sufficient to shift the belt from one pulley to the other, as desired. With the arrangement of parts shown, when the brake is depressed the belt is thrown onto the driving-pulley, and the belt is shifted back onto the loose pulley when the brake is elevated or thrown on. The machine therefore runs only when the foot of the operator presses upon the treadle, and the brake is applied by the action of the spring. Meanwhile the belt is thrown onto the loose pulley, so that the machine stops whenever the operator ceases to press upon the treadle.

Heretofore for a sewing-machine brake a horizontally-moving bar, with the end thereof acting against the end of a friction-disk, has been employed, such bar, or an attachment of the same, having sometimes been provided with projections, prongs, or pegs to serve as a belt-shifter. There were several objections to such construction, to wit: With the brake operating on the end of the disk the wear was excessive, and was not evenly distributed, the part of the brake nearest to the periphery of the disk being soon worn away, leaving the bearing-surface of the brake on that part nearest the axis of the disk, where there was little leverage, so that the brake after a time was not sufficiently effective except an excessive pressure was applied, and in any event the pressure of the brake caused an end pressure on the shaft that resulted in lost motion endwise of the shaft, which latter of course greatly damaged the machine. With my improved construction the brake, being applied to the periphery of the disk, where it has the maximum leverage, is effective, and causes no end pressure on the shaft. The brake wraps so far around the disk that an ample wearing-surface is had, and the wear is evenly distributed over the surface of the brake. It is desirable to have the driving-pulley somewhat larger than the loose pulley, so that the belt, when on the latter, is not under strain, and can contract slightly and, so to speak, recuperate. The lever H operates on the belt at points near the aforesaid pulleys, and is of course arranged on the leading side of the belt, and owing to the inclination of the lever in shifting the belt onto the driving-pulley the engaging-prong H', acting as an incline, aids the belt in mounting the enlarged driving-pulley. If the pulleys are of equal size, a lever of the bell-crank variety, as shown in Fig. 3, would answer the purpose.

What I claim is—

1. The combination, with a friction-disk mounted on the driving-shaft of the machine, and a spring-actuated brake applied to the periphery of the disk, of a belt-shifting lever operated automatically from the brake mechanism, substantially as set forth.

2. The combination, with a friction-disk having a flat periphery, said disk being mounted on the driving-shaft of the machine, and a brake operating substantially at right angles to the axis of the shaft and engaging the periphery of the disk, of a belt-shifting lever connected with and operated by the brake mechanism, substantially as set forth.

3. The combination, with a driving-shaft, friction-disk, and brake, arranged substantially as indicated, of a belt-shifting lever arranged oblique to the plane in which the belt operates, said lever being connected with and operated automatically by the brake mechanism, substantially as set forth.

4. The combination, with a friction-disk, a brake, arranged substantially as indicated, and a sleeve connected with the table for guiding the brake-rod, of a belt-shifting lever pivoted to an attachment of the sleeve, said lever being coupled with and operated by the movement of the brake-rod, substantially as set forth.

5. The combination, with a driving-shaft, friction-disk, and brake, arranged substantially as described, of a sleeve serving as a guide for the brake-rod, a spring seated in the sleeve and engaging the brake-rod, a belt-shifting lever pivoted to said sleeve in an inclined position, a slot in the lever, and a pin attached to the brake-rod and operating in said slot, the parts being arranged substantially as set forth.

In testimony whereof I sign this specification, in the presence of two witnesses, this 27th day of February, 1886.

RUEL W. WHITNEY.

Witnesses:
CHAS. H. DORER,
ALBERT E. LYNCH.